(12) United States Patent

Yu

(10) Patent No.: US 12,671,347 B2

(45) Date of Patent: Jun. 30, 2026

(54) SOLAR INVERTER WITH MULTIPLE DYNAMIC CURRENT SOURCES

(71) Applicant: North Carolina State University, Raleigh, NC (US)

(72) Inventor: Wensong Yu, Raleigh, NC (US)

(73) Assignee: NORTH CAROLINA STATE UNIVERSITY, Raleigh, NC (US)

( * ) Notice: Subject to any disclaimer, the term of this patent is extended or adjusted under 35 U.S.C. 154(b) by 190 days.

(21) Appl. No.: 18/441,451

(22) Filed: Feb. 14, 2024

(65) Prior Publication Data

US 2024/0275305 A1 Aug. 15, 2024

Related U.S. Application Data

(60) Provisional application No. 63/445,823, filed on Feb. 15, 2023.

(51) Int. Cl.
H02M 7/515 (2007.01)
H02J 1/102 (2026.01)
*H02J 101/24* (2026.01)

(52) U.S. Cl.
CPC ........... *H02M 7/5155* (2013.01); *H02J 1/102* (2013.01); *H02J 2101/25* (2026.01)

(58) Field of Classification Search
CPC ............. H02J 2300/24; H02J 2300/26; H02M 7/5155; H02M 7/5152
See application file for complete search history.

(56) References Cited

U.S. PATENT DOCUMENTS

| | | | | |
|---|---|---|---|---|
| 2012/0319494 A1* | 12/2012 | Ecrabey | .................. | H02J 3/381 307/82 |
| 2016/0190809 A1* | 6/2016 | Ma | .......................... | H02J 3/381 307/77 |
| 2018/0269799 A1* | 9/2018 | Kimura | ............... | H02M 7/5387 |

FOREIGN PATENT DOCUMENTS

| | | | | | |
|---|---|---|---|---|---|
| CN | 103825472 A | * | 5/2014 | | |
| CN | 106603007 A | * | 4/2017 | ........... | G01R 27/025 |
| CN | 113131770 A | * | 7/2021 | ............ | H02M 7/483 |

OTHER PUBLICATIONS

Machine translation of CN 106603007 by Clarivate Analytics, Oct. 2025, 12 pages.*
Machine translation of CN113131770 by Clarivate Analytics, Oct. 2025, 6 pages.*
Machine translation of CN 103825472 by Clarivate Analytics, Oct. 2025, 4 pages.*

(Continued)

*Primary Examiner* — Harry R Behm
(74) *Attorney, Agent, or Firm* — Thomas | Horstemeyer, LLP

(57) ABSTRACT

Various examples are provided related to photovoltaic systems that utilize multiple current source inverters. In one example, a solar inverter system includes DC-DC current source converters coupled to a DC link and a grid-frequency inverter coupled to the DC link. The DC power can be converted from energy obtained from a photovoltaic (PV) panel coupled to the DC-DC current source converters and the grid-frequency inverter can generate AC power from the DC power provided to the DC link.

15 Claims, 7 Drawing Sheets

(56)  References Cited

OTHER PUBLICATIONS

R. M. Burkart and J. W. Kolar, "Comparative Life Cycle Cost Analysis of Si and SiC PV Converter Systems Based on Advanced of Si and SiC PV Converter Systems η-ρ-σ Multi-objective Optimization Techniques," in IEEE Transactions on Power Electronics, vol. 32, No. 6, pp. 4344-4358, Jun. 2017.

Palmour, J.W.; Cheng, L.; Pala, V., "Silicon carbide power MOSFETs: Breakthrough performance from 900 V up to 15 kV," Power Semiconductor Devices & IC's (ISPSD), 2014 IEEE 26th International Symposium on , vol. No., pp. 79,82, Jun. 15-19, 2014.

R. Naik, N. Mohan, "A novel grid interface for photovoltaic, wind-electric and fuel-cell systems with a controllable power factor of operation", Proc. Appl. Power Electron. Conf. Exposition (APEC), pp. 995-998, 1995.

B. Sahan, S. V. Araújo, C. Noding and P. Zacharias, "Comparative Evaluation of Three-Phase Current Source Inverters for Grid Interfacing of Distributed and Renewable Energy Systems," in IEEE Transactions on Power Electronics, vol. 26, No. 8, pp. 2304-2318, Aug. 2011.

* cited by examiner

SOLAR INVERTER WITH MULTIPLE DYNAMIC CURRENT SOURCES

CROSS REFERENCE TO RELATED APPLICATIONS

This application claims priority to, and the benefit of, U.S. provisional application entitled "Solar Inverter with Multiple Dynamic Current Sources" having Ser. No. 63/445, 823, filed Feb. 15, 2023, which is hereby incorporated by reference in its entirety.

BACKGROUND

Solar energy is becoming a more prevalent source of power at both the commercial and consumer level. Solar panels generate a DC voltage, whereas the power grid is designed to receive AC voltage from power sources. DC-AC converters are employed in power systems to convert DC voltage to AC voltage. Conventional DC-AC converters use high frequency switching devices with an output-to-loss ratio of 30-50, with current state of the art DC-AC converters providing power to the grid at a cost of about 11 cents/kWh. Continued improvement in efficiency, cost and reliability is desirable.

SUMMARY

Aspects of the present disclosure are related to photovoltaic systems that utilize multiple current source inverters. In one aspect, among others, a solar inverter system comprises a plurality of DC-DC current source converters coupled to a DC link, each DC-DC current source converter configured to provide DC power to the DC link, the DC power converted from energy obtained from at least one photovoltaic (PV) panel coupled to the plurality of DC-DC current source converters; and a grid-frequency inverter coupled to the DC link, the grid-frequency inverter configured to generate AC power from the DC power provided to the DC link. In one or more aspects, the generated AC power can be provided to a power grid through an isolation transformer. The isolation transformer can be a wye-delta transformer. The plurality of DC-DC current source converters can be maximum power point tracking (MPPT) converters. The plurality of DC-DC current source converters can be three-level buck converters.

In various aspects, an individual DC-DC converter of the plurality of DC-DC current source converters can comprise hybrid switches each having a Si-IGBT switch in parallel with a SiC-MOSFET switch. Switching of the hybrid switches in the DC-DC converter can be controlled based at least in part upon comparison of an on-state voltage of the DC-DC converter to a first defined voltage level associated with the SiC-MOSFET switch and comparison of the on-state voltage to a second defined voltage level associated with the Si-IGBT switch. The Si-IGBT switch and the SiC-MOSFET switch can be turned ON at a rising edge of a gate signal. The Si-IGBT switch can be turned OFF in response to the on-state voltage reaching the second defined voltage level before the falling edge of the gate signal. The Si-IGBT switch can be turned OFF in response to a falling edge of the gate signal if the on-state voltage does not reach the second defined voltage level. The SiC-MOSFET switch can be turned OFF in response to the on-state voltage reaching the first defined voltage level before the falling edge of the gate signal. The SiC-MOSFET switch can be turned OFF in response to a falling edge of the gate signal if the on-state voltage does not reach the first defined voltage level. The SiC-MOSFET switch can be turned OFF a predefined delay time after the falling edge of the gate signal.

In some aspects, the grid-frequency inverter can comprise Si-IGBT and Si-thyristor independent phase control. The plurality of DC-DC current source converters can be sealed within one or more housing. The one or more housing can be configured to provide natural cooling to one or more DC-DC current source converter sealed inside. The one or more housing can be configured to provide IP65 sealing.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
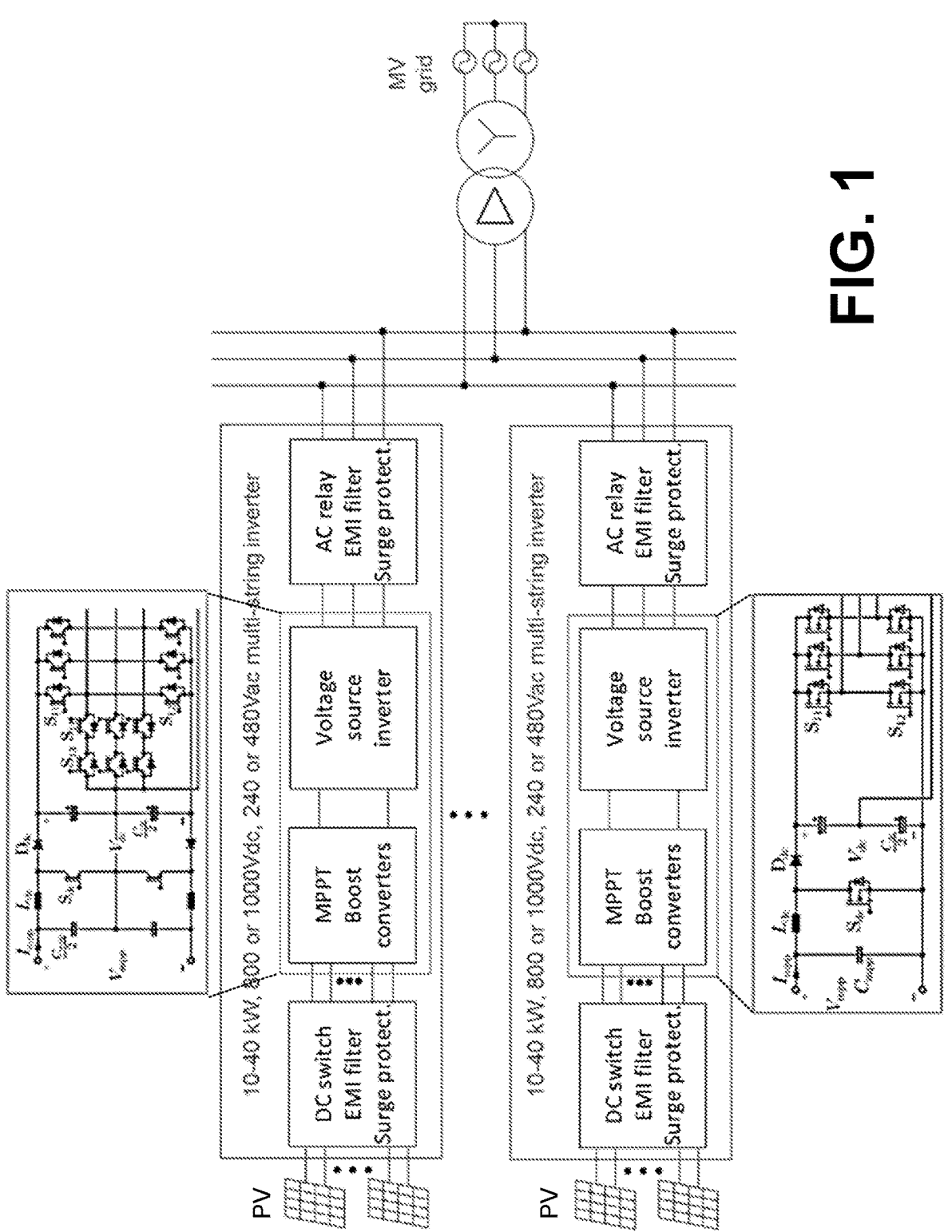
FIG. 1 graphically illustrates an example of a multi-string commercial-scale photovoltaic inverter system, in accordance with various embodiments of the present disclosure.

Disclosed herein are various examples related to photovoltaic systems that utilize multiple current source inverters. Reference will now be made in detail to the description of the embodiments as illustrated in the drawings, wherein like reference numbers indicate like parts throughout the several views.

Referring to FIG. 1, shown is an example of a multi-string transformerless commercial-scale photovoltaic (PV) inverter system comprising a plurality of multi-string inverters that are configured to convert DC energy from the PV panels to AC power that is supplied to the grid through an isolation transformer. The multi-string transformerless three-phase inverters can use a maximum power point tracking (MPPT) boost converter plus voltage source inverter. Mainstream products for commercial-scale solar markets can have a voltage of, e.g., 800 Vmax or 1000 Vmax and a power level of, e.g., about 10 kW-40 kW. The boost converter and voltage source inverter can be two-level or three-level topology.

Based on comparative life cycle cost analysis of Si and SiC PV converter systems, the hard-switched two-level SiC PV system was found to be a better solution featuring the lower life cycle costs as well as lower component costs. Systematic comparison between current source inverters (CSIs) and voltage source inverters (VSIs) showed that CSIs can present interesting alternatives for single-string solar systems. The challenges of the systems of FIG. 1 include: 1) relatively high cost because of limited power rating and large number of components if a two-stage high-frequency power conversion is adopted; 2) degraded system efficiency and low power density if relatively slow Si-IGBT power semiconductors is used; and 3) limited lifetime because of vulnerable components like fans or short lifetime electrolytic capacitors.

Figure 2:
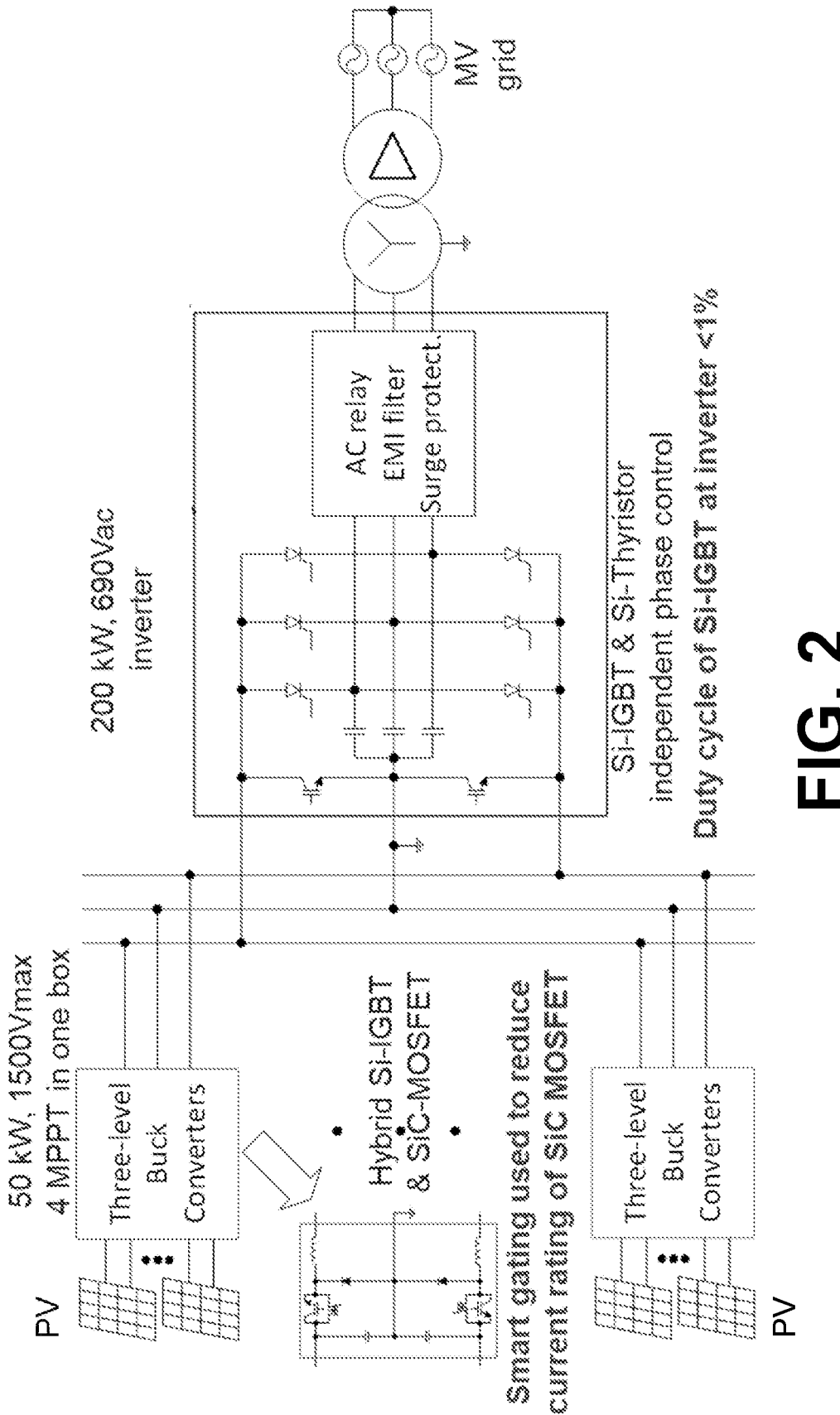
FIG. 2 graphically illustrates an example of a photovoltaic inverter system utilizing a plurality of dynamic current source inverters to feed a grid-frequency inverter, in accordance with various embodiments of the present disclosure.

To address these shortcomings, a plurality of multi-string MPPT converters can be used as multiple current sources in parallel to feed a grid-frequency inverter through a DC link, as illustrated in the example of FIG. 2. The output of the grid-frequency inverter (e.g., 200 kW, 690 Vac) can be supplied to the grid through an isolation transformer. The DC-DC converters can be controlled using a master controller (e.g., through control software) to output a DC/AC hybrid signal, which allows for low frequency switches in the MPPT converter circuits rather than high frequency switches. This can allow the number of power stages to be reduced and elimination of high frequency active switches in the converters. The output-to-loss rations can also be increased from about 30-50 to about 75-90.

For a commercial-scale plant, the use of mixed Si-thyristor, Si-IGBT and SiC-MOSFET can significantly reduce lifetime costs while increasing the system energy efficiency. For example, the MPPT converters can include hybrid Si-IGBT and SiC-MOSFET switches as shown in FIG. 2, and the grid-frequency inverter can include Si-IGBT and Si-thyristor switches for independent phase control. Smart gating ca be used to reduce the current rating of SiC-MOSFETs and a duty cycle of the Si-IGBTs at the inverter can be less than 1%. A cost comparison of semiconductors at 100-piece quantities illustrates the potential savings (Si-thyristor (1600V, 300 A, SEMiX302KT16s) at $40.71/pcs; Si-IGBT (1700V, 300 A, SEMiX302GB17E4s) at $87.25/pcs.; and SiC-MOSFET (1700V, 300 A, CAS300M17BM2) at $599.18/pcs).

The holistically distinctive features of the disclosed technology can include:

The three-phase grid-frequency inverter can provide increased efficiency (e.g., 99.7%), significantly reduced cost, and reactive power capability. The grid-frequency inverter can use a mix of high current rating 1700V Si-thyristors and low current rating 1200V Si-IGBTs to significantly improve the energy efficiency while reducing the system cost.

The cost-effective MPPT converters can be controlled as multiple current sources in parallel, as illustrated in FIG. 2. Mixed high current rating 1200 V Si-IGBT and low current rating 1200 V SiC-MOSFET with smart gating can be used to reduce the conduction and switching losses, reduce size and weight of the heatsink and the passive components.

The use of natural cooling, fully-sealed (IP65) housing designs can provide protection against water penetration and long-term effects of dust. Having no vulnerable components, like fans, can help lower the cost of operation and maintenance, improve the system reliability and potentially extend lifetime up to, e.g., 50 years. In some implementations, a plurality of MPPT converters can be protected in a single housing.

As shown in FIG. 2, this novel commercial-scale PV system infrastructure includes multiple MPPT three-level buck converters as multiple current sources in parallel to feed a grid-frequency inverter. Thyristor control can be solved by interleaving technology thanks to the multiple current sources in the proposed solution. Multiple MPPT converters can be easily integrated with grid-frequency inverter because the DC link voltages are substantially independent of the dynamics of the multiple current sources.

Figure 3A:
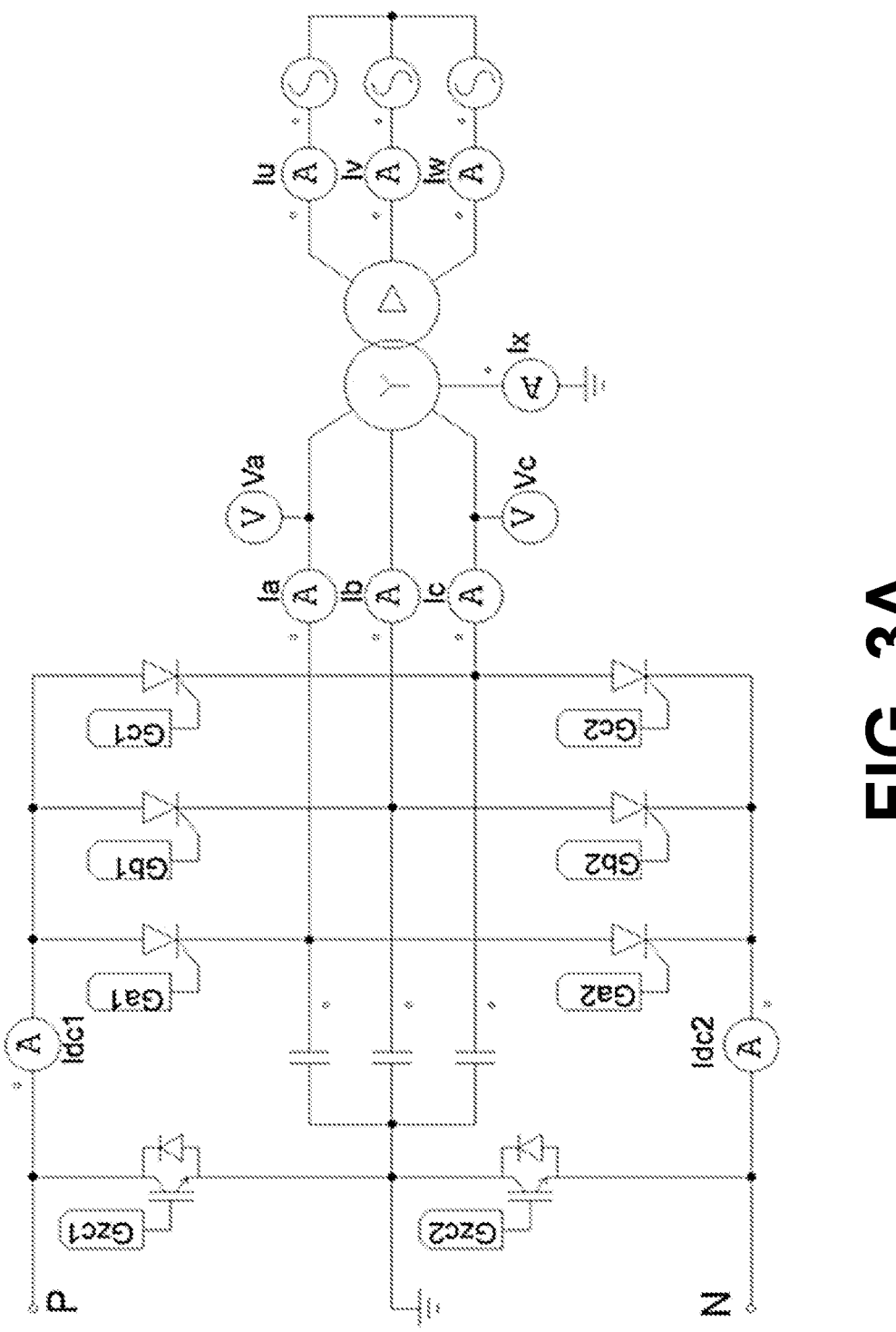
FIGS. 3A and 3B illustrates examples of circuit topology and control method to turn off the silicon thyristors of the inverter, in accordance with various embodiments of the present disclosure.

FIG. 3A illustrates an example of the circuit topology comprising IGBTs to turn off silicon thyristors using sharp pulses in coordination with specific time steps of the grid voltage cycle. The circuitry can comprise current sensors for monitoring MPPT converter currents (Idc1 and Idc2) and phase currents (Ia, Ib and Ic). The inverter design utilizes a wye-delta transformer configuration as shown. This topology can be used for DC to AC conversion where the DC input is multiple controlled dynamic current sources or power sources and the AC is assumed to be a three phase voltage source.

Figure 3B:
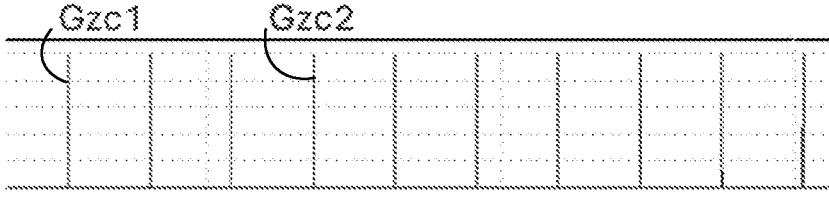
Figure 3B:
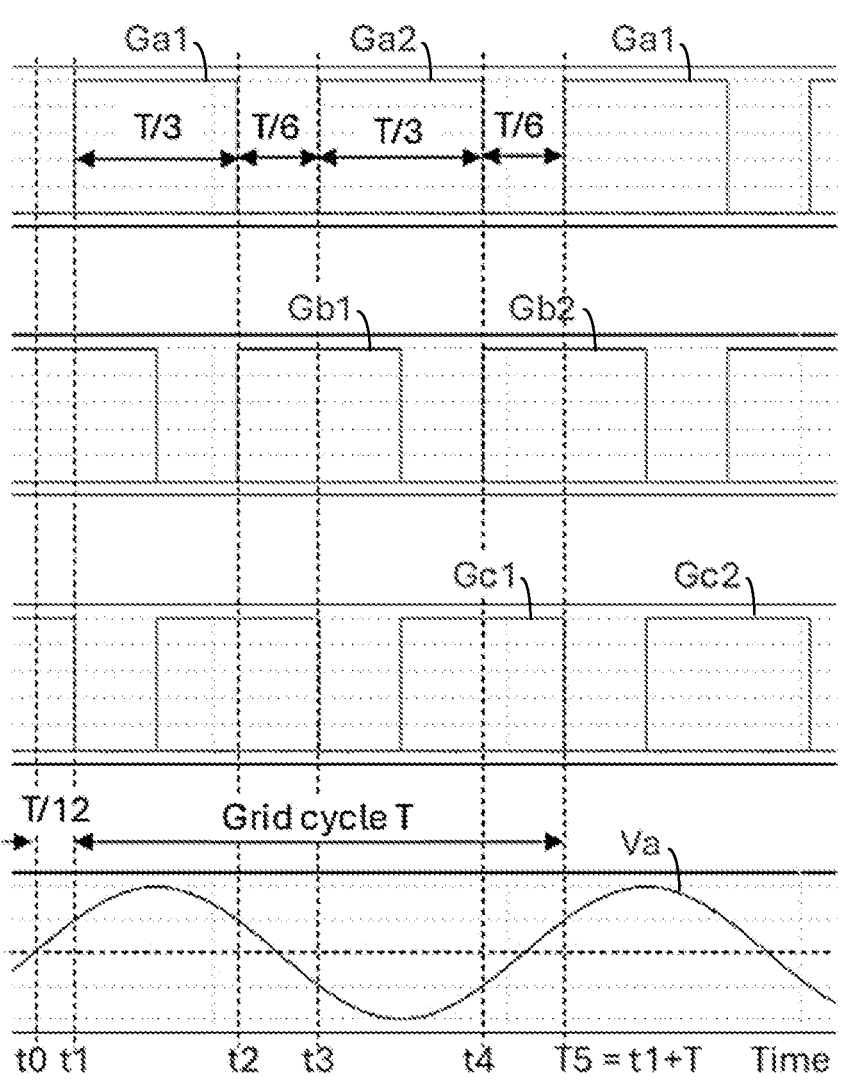

FIG. 3B illustrates an example of the control method using sharp pulses (e.g., 5 μs) from IGBTs to turn off the silicon thyristors. Gcz1 is a silicon IGBT that operates at three times grid frequency to turn off thyristors Ga1, Gb1, and Gc1 that control power for phases A, B, and C, respectively. For example, when Gzc1 is turned on at t2, the thyristor Ga1 is forced to be turned off. Similarly, when Gzc1 is turned on at t4, the thyristor Gb1 is forced to be turned off. In a similar fashion, Gcz2 turns off thyristors Ga2, Gb2, and Gc2. The top plot shows the coordinated series of pulses, the middle plots show the thyristor operation and the bottom plot shows the output voltage of phase A.

Figure 4A:
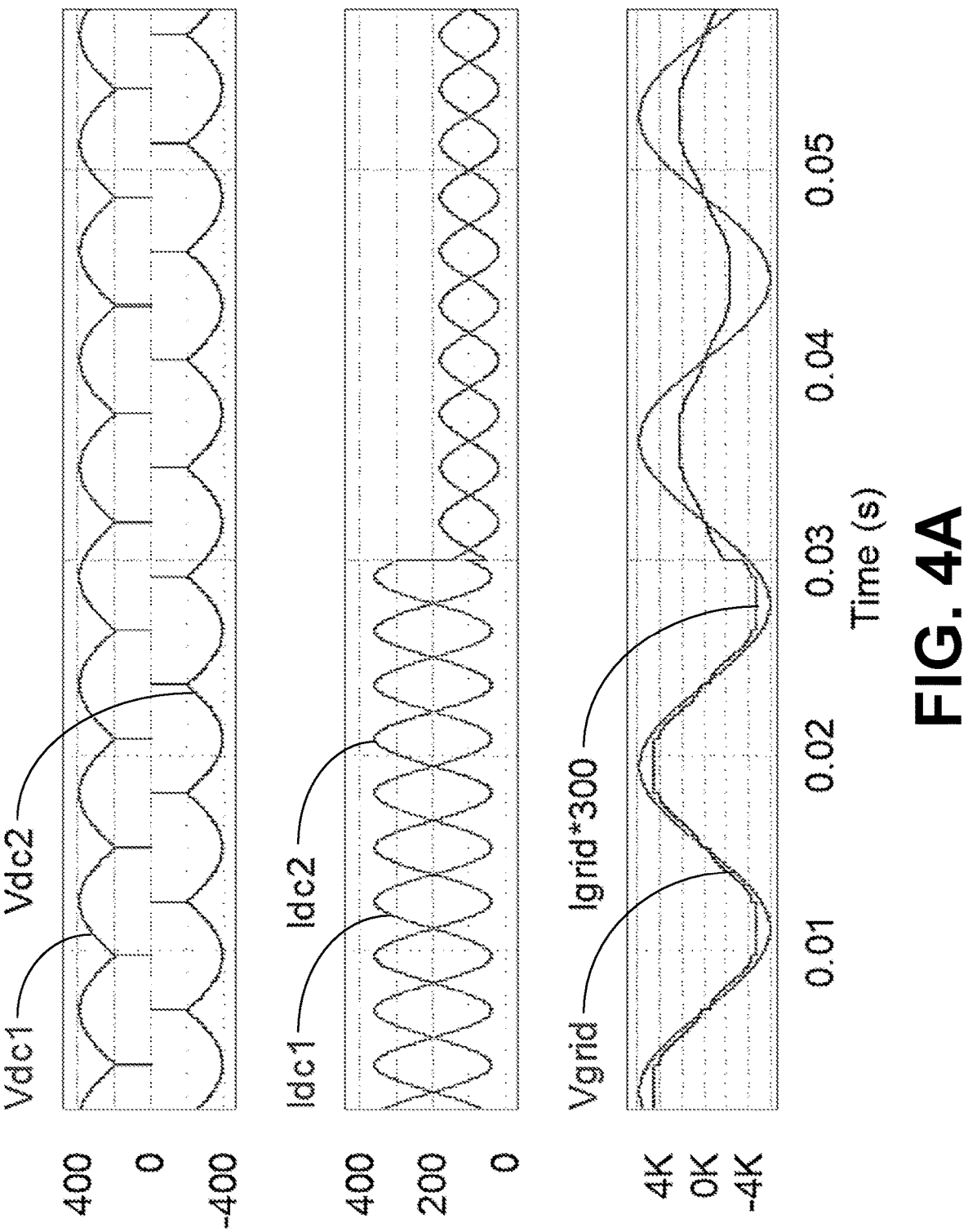
FIGS. 4A and 4B are simulation results illustrating examples of DC link and grid voltages and currents of the current source inverters and grid-frequency inverter, in accordance with various embodiments of the present disclosure.
Figure 4B:
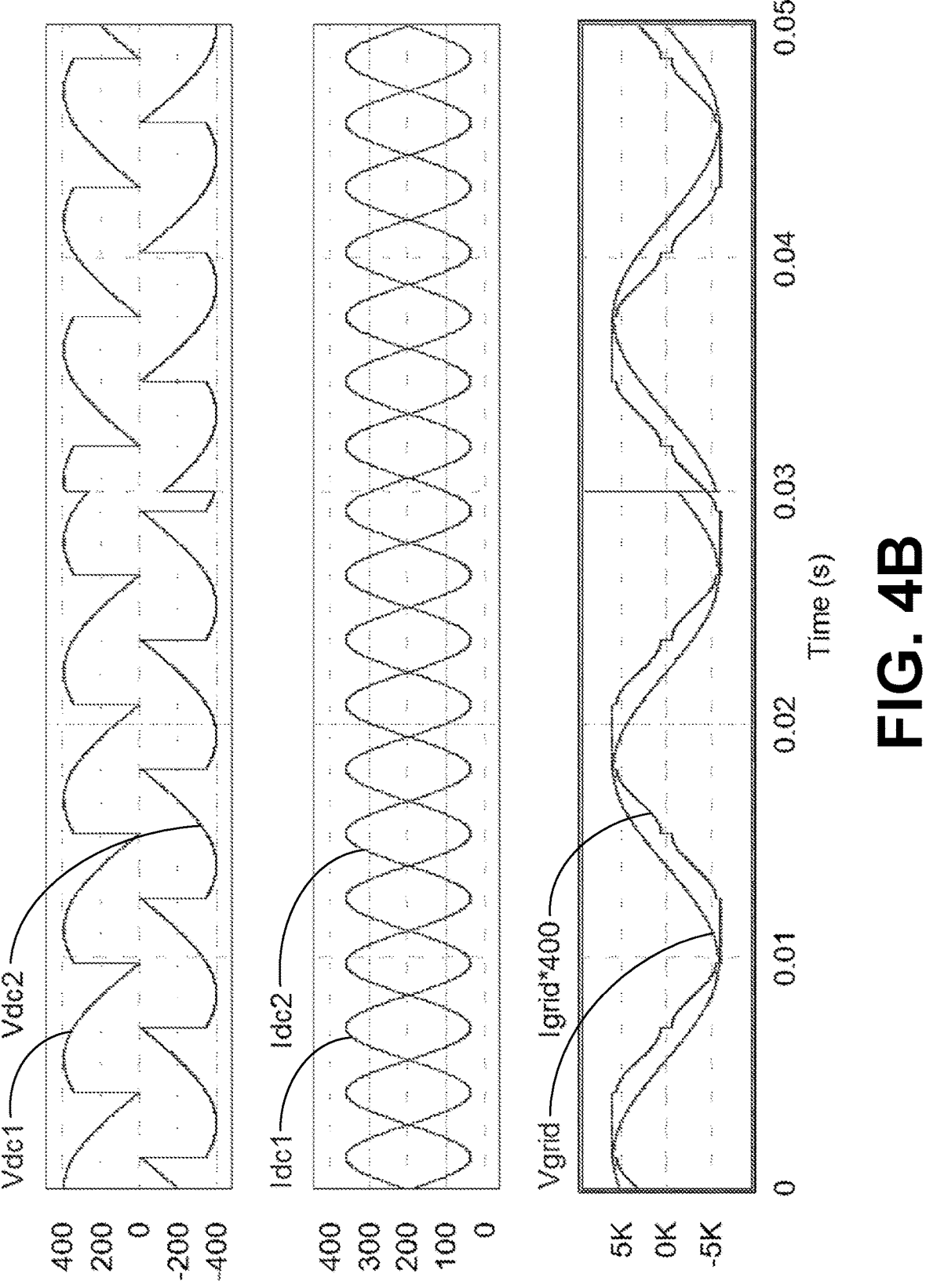

This is illustrated by the simulation results in FIG. 4A, where the DC link voltages (Vdc1 and Vdc2) are shown at the top, the MPPT converter currents (Idc1 and Idc2) are shown in the middle, and the grid-frequency inverter voltage (Vgrid) and current (Igrid) are shown on the bottom. The simulation results of FIG. 4B demonstrate that the proposed inverter is capable of active and reactive power control since that grid current can be in phase, leading or lagging to grid voltage.

Figure 5:
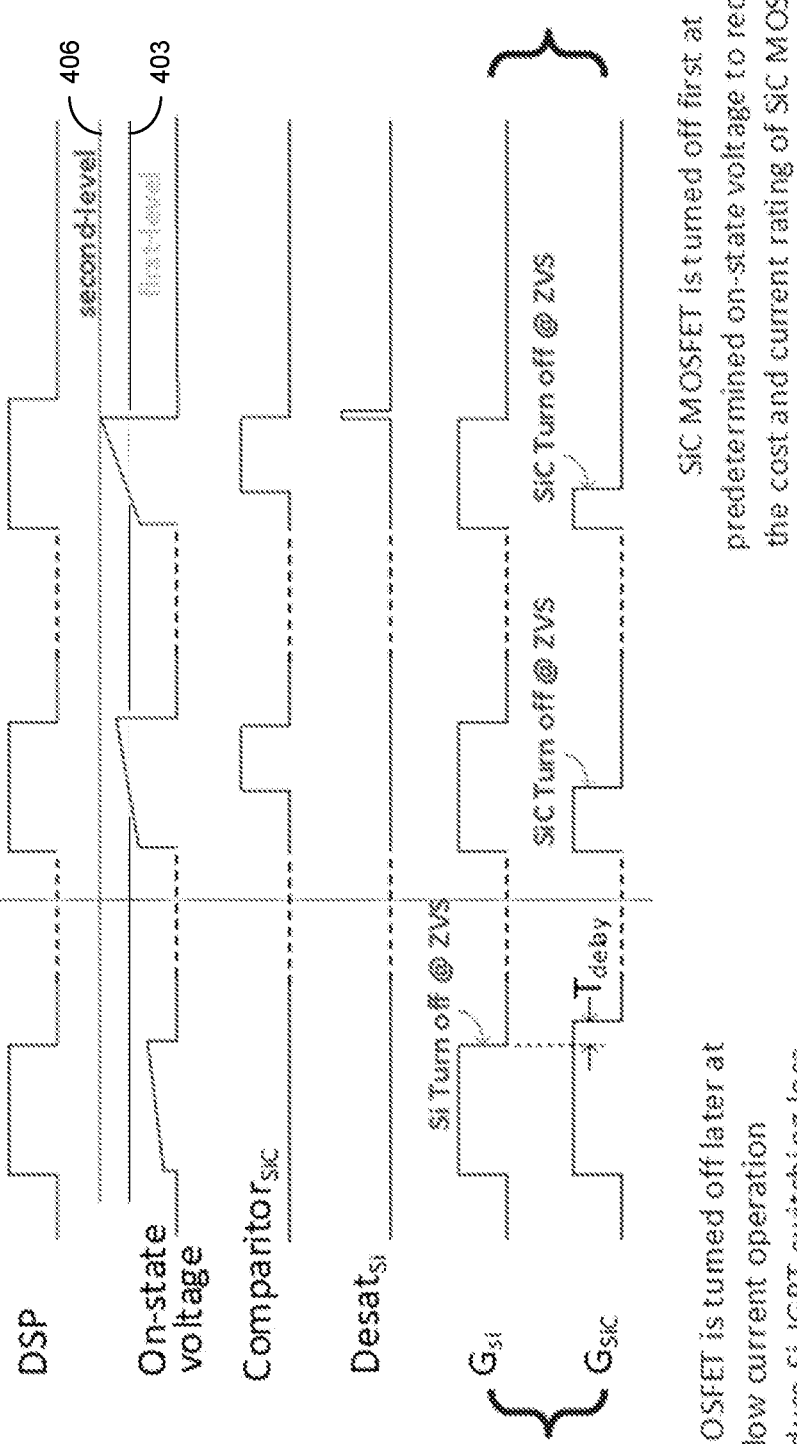
FIG. 5 illustrates an example of smart gating of the current source inverters, in accordance with various embodiments of the present disclosure.

Smart gating technology can be used to reduce current rating and cost of SiC-MOSFET in the MPPT converters while enhancing current surge capability. The cost-effective adoption of wide bandgap (WBG) semiconductors provides an advantage for the proposed solar system. As shown in FIG. 5, integration of high current rating 1200 V Si-IGBT and low current rating 1200 V SiC-MOSFET in the hybrid switch through the use of smart gating is cost-effective, reliable and efficient. The Si-IGBT and SiC-MOSFET can be switched ON at a rising edge of a DSP gate signal. The on-state voltage can be compared to a defined first voltage level 403 and a defined second voltage level 406. The SiC-MOSFET can be switched OFF based on the comparison of the on-state voltage to the first level 403 or after a defined delay (Tdelay) after the falling edge of the DSP gate signal if the on-state voltage does not reach the first level 403. The Si-IGBT can be switched OFF based on the comparison of the on-state voltage to the second voltage level 406 or the falling edge of the DSP gate signal if the on-state voltage does not reach the second level 406.

With this control, the SiC-MOSFET is turned OFF later at low current operation to reduce the Si-IGBT switching loss and the SiC-MOSFET is turned OFF first at a predetermined on-state voltage (first level 403) to reduce the cost and current rating of the SiC-MOSFET while enhancing the current surge capability. This innovation can help to reduce conduction and switching losses, reduce size of the passive components, and enable natural cooling and fully-sealed design to improve the system reliability and lifetime. For example, it is possible for a 200 kW commercial-scale 1500V system as shown in FIG. 2 to achieve a reduced system cost ($0.07/kWh over $0.11/kWh) and improved service lifetime (20-30 years over 10-15 years).

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A solar inverter system, comprising:
a plurality of DC-DC current source converters coupled to a DC link, each DC-DC current source converter configured to provide DC power to the DC link, the DC power converted from energy obtained from at least one photovoltaic (PV) panel coupled to the plurality of DC-DC current source converters, where an individual DC-DC converter of the plurality of DC-DC current source converters comprises hybrid switches each having a Si-IGBT switch in parallel with a SiC-MOSFET switch, wherein switching of the hybrid switches in the individual DC-DC converter is controlled based at least in part upon comparison of an on-state voltage of the individual DC-DC converter to a first defined voltage level associated with the SiC-MOSFET switch and comparison of the on-state voltage to a second defined voltage level associated with the Si-IGBT switch; and
a grid-frequency inverter coupled to the DC link, the grid-frequency inverter configured to generate AC power from the DC power provided to the DC link.

2. The solar inverter system of claim 1, wherein the generated AC power is provided to a power grid through an isolation transformer.

3. The solar inverter system of claim 2, wherein the isolation transformer is a wye-delta transformer.

4. The solar inverter system of claim 1, wherein the plurality of DC-DC current source converters are maximum power point tracking (MPPT) converters.

5. The solar inverter system of claim 4, wherein the plurality of DC-DC current source converters are three-level buck converters.

6. The solar inverter system of claim 1, wherein the Si-IGBT switch and the SiC-MOSFET switch are turned ON at a rising edge of a gate signal.

7. The solar inverter system of claim 1, wherein the Si-IGBT switch is turned OFF in response to the on-state voltage reaching the second defined voltage level before the falling edge of the gate signal.

8. The solar inverter system of claim 1, wherein the Si-IGBT switch is turned OFF in response to a falling edge of the gate signal if the on-state voltage does not reach the second defined voltage level.

9. The solar inverter system of claim 1, wherein the SiC-MOSFET switch is turned OFF in response to the on-state voltage reaching the first defined voltage level before the falling edge of the gate signal.

10. The solar inverter system of claim 1, wherein the SiC-MOSFET switch is turned OFF in response to a falling edge of the gate signal if the on-state voltage does not reach the first defined voltage level.

11. The solar inverter system of claim 10, wherein the SiC-MOSFET switch is turned OFF a predefined delay time after the falling edge of the gate signal.

12. The solar inverter system of claim 1, wherein the grid-frequency inverter comprises Si-IGBT and Si-thyristor independent phase control.

13. The solar inverter system of claim 1, wherein the plurality of DC-DC current source converters are sealed within one or more housings.

14. The solar inverter system of claim 13, wherein the one or more housings is configured to provide natural cooling to one or more DC-DC current source converter sealed inside.

15. The solar inverter system of claim 13, wherein the one or more housings is configured to provide IP65 sealing.

* * * * *